United States Patent [19]

Krennbauer et al.

[11] Patent Number: 4,685,970

[45] Date of Patent: Aug. 11, 1987

[54] PROCESS AND APPARATUS FOR THERMALLY TREATING FINE-GRAINED SOLIDS, PARTICULARLY FOR BURNING GROUND RAW MATERIAL FOR MAKING CEMENT

[75] Inventors: Franz Krennbauer, Linz; Friedrich Fehringer, Ulmerfeld, both of Austria

[73] Assignees: Voest-Alpine Aktiengesellschaft, Linz, Austria; VEB Schwermaschinenbau-Kombinat "Ernst Thalman" Magdeburg, Magdeburg, German Democratic Rep.

[21] Appl. No.: 801,055

[22] Filed: Nov. 22, 1985

[30] Foreign Application Priority Data

Jan. 11, 1985 [AT] Austria .................................. 57/85

[51] Int. Cl.⁴ ............................................... C04B 7/43
[52] U.S. Cl. ..................... 106/100; 432/14; 432/106
[58] Field of Search ................... 106/100; 432/14, 106

[56] References Cited

U.S. PATENT DOCUMENTS 4,386,906 6/1983 Dano ...................................... 432/14
4,405,374 9/1983 Krennbauer ......................... 106/100
4,431,453 2/1984 Feige et al. .......................... 106/100
4,431,454 2/1984 Krennbauer ....................... 106/100

FOREIGN PATENT DOCUMENTS 375628 1/1984 Austria .
0063110 10/1982 European Pat. Off. .
0078250 5/1983 European Pat. Off. .
2712238 10/1978 Fed. Rep. of Germany ...... 106/100

Primary Examiner—William R. Dixon, Jr.
Assistant Examiner—Steven Capella
Attorney, Agent, or Firm—Kurt Kelman

[57] ABSTRACT

In a process of thermally treating fine-grained solids, the latter are preheated in a plurality of heat exchange stages by means of exhaust gases flowing in two parallel exhaust gas lines and are subsequently heated only by exhaust gases from a furnace and are then fed to the reaction vessel and subsequently to the furnace. The two exhaust gas streams are supplied with a mixture of exhaust gases from the furnace and exhaust gases from the reaction vessel.

To permit different condition in the heat exchange stages associated with the two exhaust gas lines to be taken into account, two partial streams of exhaust gases are withdrawn from the reaction vessel and supplied to respective ones of the exhaust gas lines. Two partial streams of exhaust gases from the furnace are admixed to respective ones of said partial exhaust gas streams from the reaction vessel.

8 Claims, 2 Drawing Figures

PROCESS AND APPARATUS FOR THERMALLY TREATING FINE-GRAINED SOLIDS, PARTICULARLY FOR BURNING GROUND RAW MATERIAL FOR MAKING CEMENT

BACKGROUND OF THE INVENTION

1. Field of the Invention

This invention relates to a process of thermally treating fine-grained solids, particularly of preheating, calcining and burning ground raw material for making cement, wherein the solids are preheated in a multistage heat exchanger by means of a mixture of exhaust gases from a furnace and a reaction vessel, which mixture is conducted in two parallel exhaust gas lines, and the solids are conducted between heat exchange stages associated with one of said exhaust gas lines and heat exchange stages associated with the other exhaust gas line in alternation, the solids are subsequently heated further only by the exhaust gas stream from the furnace, and are subsequently supplied to the reaction vessel and thereafter to the furnace, and the exhaust gas from the furnace which has been used to heat the solids in the heat exchange stage which directly precedes the reaction vessel in the flow path for the solids is subsequently mixed with the exhaust gas from the reaction vessel to form the mixture of exhaust gas to be conducted through the two exhaust gas lines. The invention relates also to apparatus for carrying out the process.

2. Description of the Prior Art

In the production of cement, the exhaust gas from the furnace should not be supplied to the calcinator and the higher exhaust gas temperature of the furnace should be utilized to preheat the raw ground material in the heat exchanger stage which directly precedes the calcinator in the solids flow path. But an arrangement in which the exhaust gas line associated with one set of heat exchange stages is flown through only by exhaust gas from the calcinator whereas the exhaust gas line associated with the other set of heat exchange stages is supplied only with the exhaust gas from the furnace would not be desirable. It is known from U.S. Pat. No. 4,431,454 that these objects can be accomplished in that the exhaust gas stream from the furnace is caused to deliver heat to the ground raw material and is then mixed with the exhaust gas stream from the calcinator in the heat exchanger stage which directly precedes the calcinator in the flow path for the ground raw material, and the stream of mixed exhaust gases is then evenly distributed to the two exhaust gas lines. The exhaust gases from the furnace and from the calcinator are mixed in a mixing chamber, which necessarily increases the overall height. Moreover, the equal distribution of the stream of mixed gases to the two exhaust gas lines extending through the heat exchanger prevents an adaptation to different conditions in the heat exchange stages associated with the two exhaust gas lines. The raw ground material is transferred in alternation between heat exchange stages associated with one exhaust gas line and heat exchange stages associated with the other exhaust gas line and the ground raw material is subsequently supplied to the calcinator so that the ground raw material is at different temperatures in the heat exchange stages associated with the two exhaust gas lines and different conditions occur in the heat exchange stages associated with the two exhaust gas lines. For an optimization of the process it would be desirable to adapt the flow rates of the exhaust gases in the two exhaust gas lines to the prevailing conditions.

SUMMARY OF THE INVENTION

It is an object of the invention so to improve a process of the kind described first hereinbefore that the different conditions in the heat exchange stages associated with the two exhaust gas lines can be taken into account in the control of the exhaust gases.

That object is accomplished by withdrawing the exhaust gas from the reaction vessel in two partial streams to be supplied to respective exhaust gas lines, and supplying two partial streams of exhaust gases from the furnace to respective ones of said partial exhaust gas streams from the reaction vessel.

Because two partial streams of exhaust gases are withdrawn from the reaction vessel, each exhaust gas line of the heat exchanger can be supplied with mixed exhaust gases in a stream which is adapted to the prevailing conditions as regards temperature and/or composition in the heat exchange stages associated with that exhaust gas line. Exhaust gases from the furnace may be supplied at different rates to the two partial streams of exhaust gases from the reaction vessel. As the total rate at which exhaust gas flows through the exhaust gas lines depends on the capacity of the fan which is associated with said exhaust gas lines, the flow rate of exhaust gases in the two exhaust gas lines will always remain the same even though the proportions of exhaust gases from the furnace and from the reaction vessel may be different. As a result, the two exhaust gas lines of the heat exchanger may have the same design.

Because the exhaust gases from the furnace are admixed to the partial streams of exhaust gases from the reaction vessel and a subsequent division is not required, there is no need for a mixing chamber so that the overall height may be desirably reduced.

Particularly desirable conditions will be obtained if the exhaust gas from the furnace is distributed in a predeterminable ratio to the two partial streams of exhaust gases from the reaction vessel. That ratio may be selected to provide for optimum conditions regarding the temperature and composition of the exhaust gases in the two exhaust gas lines so that a desirable progress of the treatment and a low tendency to form crusts can be achieved. The tendency to form crusts depends on the concentration of ballast and on the temperature conditions.

The present process is particularly suitable in the making of cement but is not restricted to that field of application and may be used whenever fine-grained solids are to be thermally treated in a reaction vessel and a succeeding furnace, as may be the case, e.g., in the production of iron.

The process may be carried out in apparatus comprising a furnace, a reaction vessel preceding the furnace, and a multistage heat exchanger, which communicates with the reaction vessel and serves to preheat the solids and in which a plurality of heat exchange units are connected in series for the flow of solids and associated with two parallel exhaust gas lines, each of which has a gas inlet that is connected to a heat exchange unit that is directly connected to the gas outlet of the furnace, each of said gas inlets is also connected to the gas outlet means of the reaction vessel, and solids outlets of respective heat exchange units associated with each of said exhaust gas lines are connected to solids inlets of respective heat exchange units associated with the other exhaust gas line. In such a known arrangement, the gas outlet means of the reaction vessel may consist of two separate gas outlets, each of which incorporates a solids separator and is connected to a gas inlet of one of the exhaust gas lines and is connected by a connecting line to the gas outlet of that heat exchange unit which directly precedes the reaction vessel, the exhaust gas stream from the reaction vessel can be distributed in a simple manner to the two exhaust gas lines of the heat exchanger after an admixing of exhaust gas from the furnace whereas the stream of mixed exhaust gases for one exhaust gas line will not be influenced by the composition of the stream of mixed exhaust gases in the other exhaust gas line. A particularly low overall height is ensured because a solids separator is incorporated in each gas outlet of the reaction vessel and the exhaust gas stream from the reaction vessel need not be divided into two partial streams after the separator.

A simple adjustment of predetermined mixing ratios in the two exhaust gas lines will be permitted within the scope of the invention if the connecting lines between the gas outlet of the heat exchange unit which directly precedes the reaction vessel in the solids flow path and the gas outlets of the reaction vessel incorporate adjustable throttle valves, e.g., gate valves, by means of which the rate can be controlled at which exhaust gas can be sucked from the furnace through the associated exhaust gas line of the heat exchanger together with the exhaust gas from the reaction vessel.

DETAILED DESCRIPTION OF THE PREFERRED EMBODIMENTS

Figure 1:
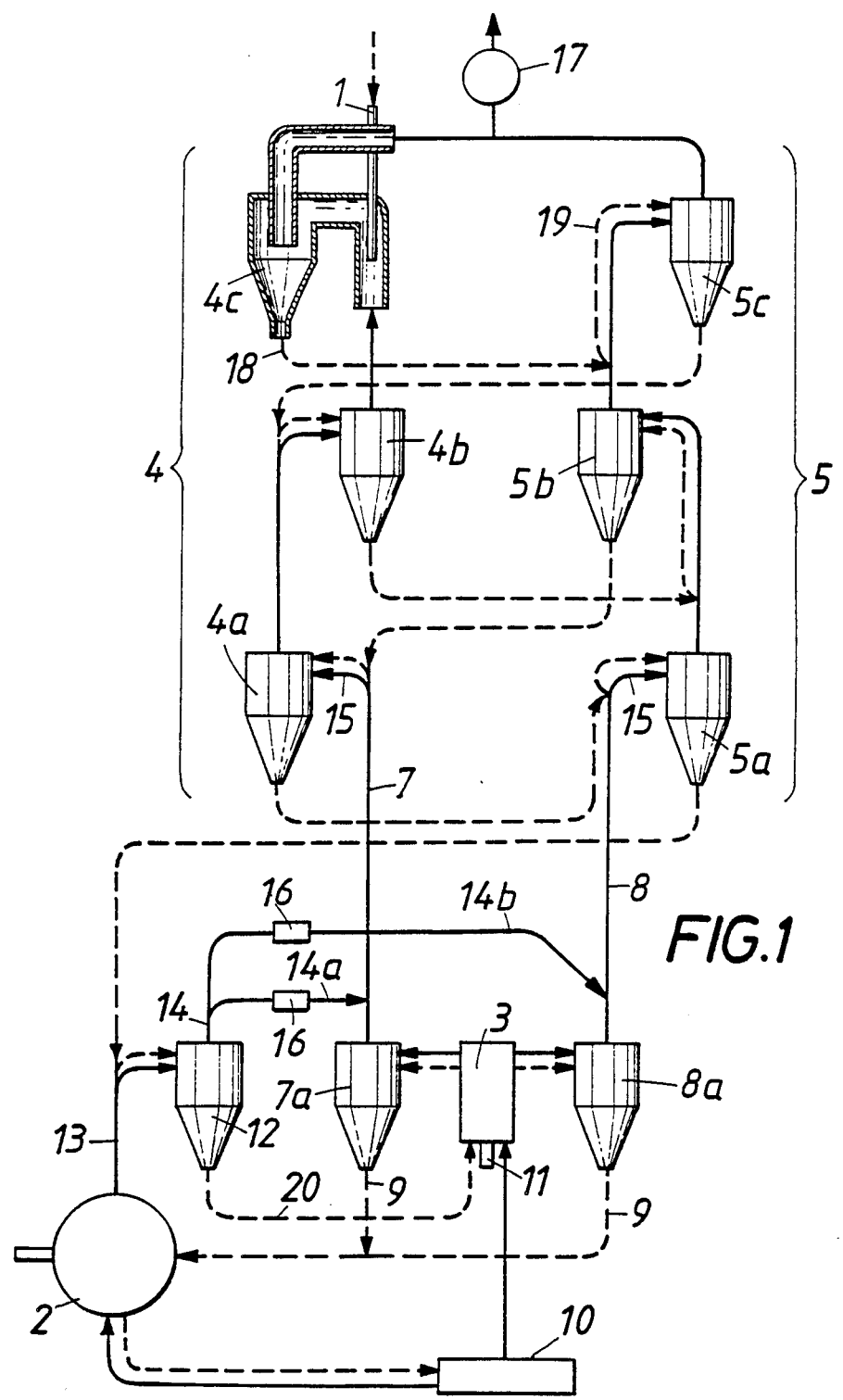
FIG. 1 is a simplified block diagram showing apparatus for making cement in accordance with the invention.

An illustrative embodiment of apparatus for carrying out the process of thermally treating fine-grained solids in accordance with the invention is shown on the drawing.

The flow path of the ground raw material is indicated by broken lines. The ground raw material is supplied by a feed line 1 to a multistage heat exchanger, which is heated with exhaust gases from a furnace 2 for burning the ground raw material which has been preheated and calcined, and with the exhaust gases from a reaction vessel 3, which precedes the rotary kiln 2 in the solids flow path and in which the ground raw material is deacidified by a suitable supply of heat. The heat exchanger comprises two parallel exhaust gas lines 4 and 5, which are respectively in heat transfer relation with the heat exchange units 4a, 4b, 4c, and with the heat exchange units 5a, 5b, 5c. Said heat exchange units consist of cyclones. The flow paths of the exhaust gas streams are indicated by solid lines. The exhaust gas lines 4 and 5 of the heat exchanger are connected to respective gas outlets 7 and 8 of the reaction vessel 3. Each of said gas outlets incorporates a solids cyclone separator 7a or 8a. The solids discharge lines 9 of said solids separators 7a and 8a lead into the furnace 2, in which the ground raw material which has been calcined is burnt to form cement clinker. The burnt cement clinker is subsequently cooled in a cooler 10. Part of the heated cooling air from the cooler is supplied as combustion air to the furnace 2. The additional heat at the rate required for the deacidification of the ground raw material in the reaction vessel 3 is supplied to the latter by a burner 11, which is supplied with combustion air consisting of part of the cooling air from the cooler 10.

In accordance with FIG. 1 the ground raw material which has been preheated in the heat exchanger 4, 5 is preheated to a higher temperature in a heat exchange unit 12, which in the flow path of the solids directly precedes the reaction vessel 3 and is supplied with exhaust gas from the furnace. That exhaust gas from the furnace is hotter than the exhaust gas from the reaction vessel 3. To preheat the solids to said higher temperature, the heat exchange unit 12 is connected to the gas outlet 13 of the furnace 2. The heat exchange unit 12 which receives exhaust gas directly from the furnace has a gas outlet 14, which is connected by two connecting lines 14a and 14b to respective gas outlets 7 and 8 of the reaction vessel 3. As a result, each of the gas inlets 15 of the two exhaust gas lines 4 and 5 of the heat exchanger is supplied with a mixture consisting of exhaust gases from the furnace and from the reaction vessel at a predetermined mixing ratio for each exhaust gas line 4 or 5. To permit an adjustment of said mixing ratios, the connecting lines 14a, 14b include adjustable throttle valves 16, which preferably consist of gate valves. In this arrangement, the stream of mixed exhaust gases in each of the two exhaust gas lines 4 and 5 can be separately adjusted in adaptation to the prevailing conditions in the heat exchangers associated with that exhaust gas line so that the process will be desirably controlled. The two streams of mixed exhaust gases which have flown through the two exhaust gas lines 4 and 5 are combined and exhausted to the atmosphere by a common fan 17.

The ground raw material which has been supplied to the heat exchanger through the feed line 1 first enters the heat exchange unit 4c, from which the stream of ground raw material is delivered via the solids outlet 18 to the solids inlet 19 of the heat exchange unit 5c associated with the other exhaust gas line 5. The stream of ground raw material is then conducted through heat exchange units associated with the exhaust gas lines 4 and 5 in alternation so that the ground raw material is heated in steps under optimum conditions in the heat exchangers associated with each exhaust gas line. From the solids outlet 20 of the last preheating stage 12 of the heat exchanger, the ground raw material is delivered to the reaction vessel 3 and is deacidified therein by a supply of heat. The ground raw material which has been calcined is discharged from the reaction vessel in two partial streams, just as the exhaust gas, and is fed through the solids separators 7a and 8a to the furnace 2 and is burnt therein.

Figure 2:
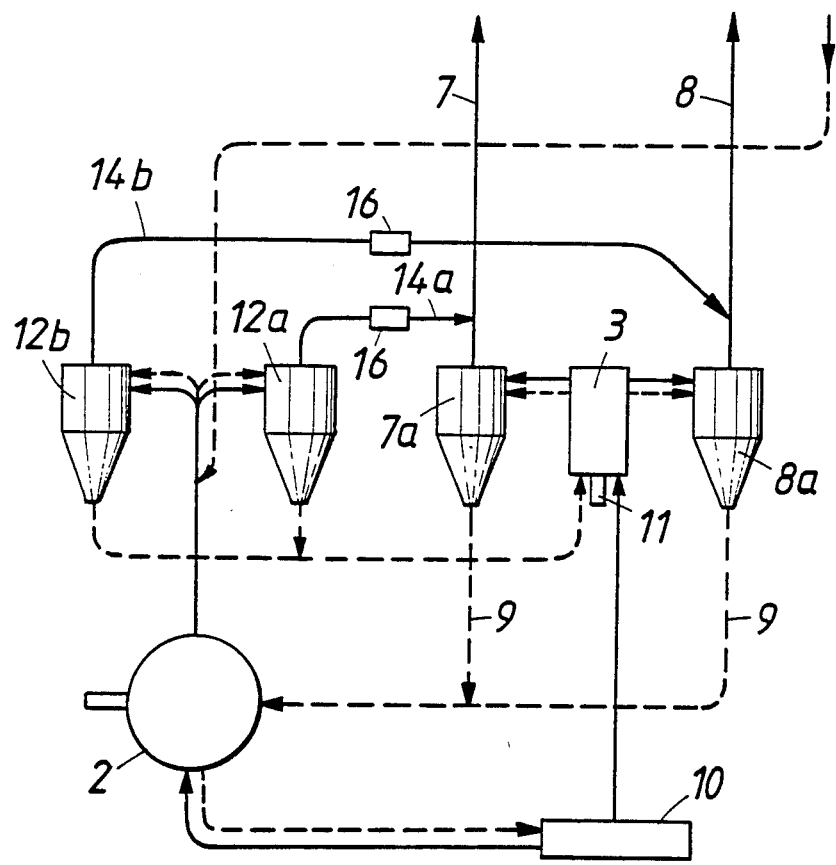
FIG. 2 shows that heat exchange stage which is heated only with the exhaust gas from the furnace in a modified apparatus.

The apparatus shown in FIG. 2 differs from that shown in FIG. 1 in that the heat exchange unit 12 which in the solids flow path directly precedes the reaction vessel 3 and is heated by the exhaust gases from the furnace 2 has been replaced by a heat exchange stage which consists of two heat exchange units 12a and 12b, which are connected in parallel so that the connecting lines 14a and 14b extend from the two separate heat exchange units 12a and 12b of said heat exchange stage rather than from the gas outlet 14 of one heat exchange unit 12. For this reason, the gas outlet 13 of the furnace 2 and the solids outlet of the heat exchange unit 5a associated with the exhaust gas line 5 are branched for connection to the two heat exchange units 12a, 12b.

Said heat exchange stage is heated only with exhaust gas from the furnace and the solids heated in both heat exchange units 12a, 12b of said stage are then jointly supplied to the reaction vessel 3.

What is claimed is:

1. In a process of thermally treating fine-grained solids in first and second sets of heat exchange stages of a preheating multistage heat exchanger, in a reaction vessel and in a furnace, in that sequence, wherein mixed exhaust gases from said reaction vessel and from said furnace are conducted through first and second exhaust gas lines in heat transfer relation with said first and second sets, respectively, of heat exchange stages of said heat exchanger, said solids are transferred through the heat exchange stages of said first and second sets in alternation and are subsequently heated further in an additional heat exchange stage heated only with exhaust gas from said furnace, and said exhaust gas from said furnace which has flown through said additional heat exchange stage is mixed with said exhaust gas from said reaction vessel to form said mixed exhaust gases, the improvement comprising the steps of
withdrawing two partial streams of reaction vessel exhaust gas from said reaction vessel,
withdrawing two partial streams of furnace exhaust gas which has flown through said additional heat exchange stage therefrom and mixing a respective one of said partial furnace exhaust gas streams with a respective one of said partial streams of reaction vessel exhaust gas to form first and second streams of mixed exhaust gases, and
supplying said first and second streams of mixed exhaust gases to said first and second exhaust gas lines, respectively.

2. The improvement set forth in claim 1 wherein the fine-grained solids consist of a ground raw material for making cement.

3. The improvement set forth in claim 1, wherein a predetermined ratio between said first and second streams of furnace exhaust gases is adjusted and maintained.

4. In apparatus for thermally treating fine-grained solids, comprising
a multi-stage heat exchanger for preheating said solids,
a reaction vessel connected to said heat exchanger to receive preheated solids therefrom and comprising reaction gas outlet means for delivering reaction vessel exhaust gas,
a furnace connected to said reaction vessel to receive reacted solids therefrom and comprising furnace gas outlet means for delivering furnace exhaust gas, and said heat exchanger comprising first and second sets of heat exchange stages, first and second exhaust gas lines in heat transfer relation with said first and second sets, respectively, of said heat exchange stages, means for transferring said solids through the heat exchange stages of said first and second sets in alternation, and an additional heat exchange stage connected, respectively, to one of said heat exchange stages of one of said sets to receive the solids therefrom, to said furnace gas outlet means to receive furnace exhaust gas therefrom, and to said reaction vessel to deliver said solids thereto, the additional heat exchange stage comprising gas outlet means for delivering the furnace exhaust gas, the improvement comprising
two gas outlets constituting said reaction vessel gas outlet means for delivering two partial streams of the reaction vessel exhaust gas, and
two connecting lines connected to said additional heat exchange stage gas outlet means receive said furnace exhaust gas therefrom and to deliver two separate streams of the furnace exhaust gas to said reaction vessel gas outlets to mix each of said partial streams of reaction vessel exhaust gas with one of said partial streams of furnace exhaust gas and thus to produce first and second streams of mixed exhaust gases,
said reaction vessel gas outlets being connected to said first and second exhaust gas lines, respectively, to deliver said first and second streams of mixed exhaust gases thereto.

5. The improvement set forth in claim 4, in which at least one of said heat exchange stages of each of said sets has a solids outlet and a solids inlet connected to the solids outlet of a heat exchange stage of the other of said sets.

6. The improvement set forth in claim 4, comprising two solids separators, each of which is connected to receive one of said partial streams of reaction vessel exhaust gas from one of said reaction vessel gas outlet and to deliver said partial stream of reaction vessel exhaust gas.

7. The improvement set forth in claim 4, wherein an adjustable throttle valve is incorporated in each of said connecting lines.

8. The improvement set forth in claim 7, wherein said throttle valves consist of gate valves.

* * * * *